United States Patent
Kaye et al.

(10) Patent No.: US 6,409,251 B1
(45) Date of Patent: Jun. 25, 2002

(54) GLASS RUN SURROUND CAP

(75) Inventors: Randy L. Kaye, Shelby Township; Adolfo Enrico Milani, Oakland, both of MI (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/320,993

(22) Filed: May 27, 1999

(51) Int. Cl.$^7$ .............................. B60J 10/08; E06B 7/18; E06B 7/22

(52) U.S. Cl. .................. 296/146.9; 49/495.1; 49/490.1

(58) Field of Search .................. 296/146.9; 52/502, 52/503; 49/377, 500.1; 500/440, 495.1, 490.1

(56) References Cited

U.S. PATENT DOCUMENTS

| | | |
|---|---|---|
| 3,029,481 A | 4/1962 | Henniges |
| 4,481,736 A * | 11/1984 | Norton .......................... 49/377 |
| 4,800,681 A | 1/1989 | Skillen et al. |
| 4,864,774 A | 9/1989 | Onishi et al. |
| 4,894,953 A * | 1/1990 | Nozaki .......................... 49/440 |
| 5,014,464 A * | 5/1991 | Dupuy et al. .................. 49/440 |
| 5,168,668 A * | 12/1992 | Mishima et al. ................ 49/440 |
| 5,226,258 A * | 7/1993 | Mesnel et al. ................. 49/490.1 |
| 5,437,124 A * | 8/1995 | Ahlfeld et al. ................ 49/479.1 |
| 5,519,968 A * | 5/1996 | Dupuy .......................... 49/377 |
| 5,557,890 A | 9/1996 | Levy et al. |
| 5,628,150 A * | 5/1997 | Mesnel ...................... 49/490.1 |
| 5,702,148 A | 12/1997 | Vaughan et al. |
| 5,743,047 A * | 4/1998 | Bonne et al. ................. 49/490.1 |
| 5,791,722 A * | 8/1998 | Nozaki et al. .............. 296/146.9 |
| 5,799,442 A * | 9/1998 | Takahashi et al. ............. 49/377 |
| 5,870,860 A * | 2/1999 | Heller .......................... 49/377 |
| 5,913,762 A * | 6/1999 | Matsumoto .................... 49/377 |
| 5,992,021 A * | 11/1999 | Takeda et al. ............ 296/146.9 |
| 6,205,712 B1 * | 3/2001 | Ellis ............................. 49/377 |

FOREIGN PATENT DOCUMENTS

| | | | | |
|---|---|---|---|---|
| DE | 31 26 491 A | | 1/1983 | |
| DE | 33 40 476 A | | 5/1985 | |
| EP | 0194236 | * | 9/1986 | |
| EP | 0 587 428 A | | 3/1994 | |
| EP | 0 792 766 A | | 9/1997 | |
| GB | 1 519 479 A | | 7/1978 | |
| GB | 002273734 A | * | 6/1994 | ............... 296/146.9 |
| JP | 0078842 | * | 5/1983 | ............... 296/146.9 |
| JP | 404110228 A | * | 4/1992 | ............... 296/146.9 |
| JP | 405016672 A | * | 1/1993 | ............... 296/146.9 |
| WO | WO 97 39907 A | | 10/1997 | |

OTHER PUBLICATIONS

Sherri Begin, Standard's Module Speeds Assembly, Rubber & Plastics News, Feb. 22, 1999.

* cited by examiner

Primary Examiner—Joseph D. Pape
Assistant Examiner—Hilary Gutman
(74) Attorney, Agent, or Firm—Brian B. Shaw, Esq.; Stephen B. Salai, Esq.; Harter Secrest and Emery LLP

(57) ABSTRACT

A decorative window surround sealing system includes a plurality of seals adapted to be mounted on a vehicle body for sealing a movable window panel in a window opening, each of the seals having an exterior surface, at least one fitting on at least one of the plurality of seals, a one piece surround cap having at least one cooperative fitting compatible with at least one fitting on the at least one of the plurality of seals for attaching the surround cap to the at least one fitting, the decorative surround cap covering a substantial portion of the exterior surface of each of the plurality of seals.

16 Claims, 9 Drawing Sheets

GLASS RUN SURROUND CAP

BACKGROUND OF THE INVENTION

This invention relates generally to an exterior decorative trim piece for motor vehicle windows, and more particularly to a molded one piece surround trim strip that is used to cover a plurality of seals in a vehicle window opening.

Movable windows in motor vehicles are conventionally sealed by elastomeric seals located at the periphery of the window opening. More specifically, a typical movable window in a motor vehicle is sealed at its bottom edge by a belt line seal, at its sides by one or more glass run seals, and at the top of the window opening by an edge receiving seal.

Conventional sealing systems used with movable window panes in automobiles usually comprise a number of separate pieces that are attached to a weld flange associated with the window aperture, or to channels that are attached to the structure surrounding the window aperture prior to the installation of the glass run. These elements include inner and outer belt line seals, glass run seals and header seals among others. Corner pieces are normally employed at the joints between the sealing elements.

Glass run channels are used in motor vehicles to support window panes that are movable between an open and a closed position. The glass run channels guide the window pane along its front and rear vertical edges during movement, and support the window pane so as to form a seal between the window pane and the vehicle door or body. The belt line and header seals also form weather resistant seals between the vehicle body and the movable window pane.

A variety of materials have been incorporated in seals. Thermo setting materials, such as EPDM rubber are generally considered to provide the best performance. EPDM rubber is almost universally used as a sealing material because of its very good sealing characteristics, a long life and other properties that make it particularly well suited to this application. Rubber seals provide a good seal, withstand a wide range of temperatures, and are easily extruded in configurations that allow them to be used in a wide variety of particular applications.

A persistent disadvantage of rubber seals is that they are normally coal black in color, and cannot be readily made in colors other than black. EPDM rubber is difficult or impossible to color, and therefore is almost universally black, and has a relatively low gloss. Although vehicle purchasers are used to low gloss seals for movable and fixed vehicle windows, there is a demand among vehicle designers for systems that allow different color choices, so that, for example, the seals can be matched or coordinated with body colors, chrome or other treatments can be used, and basically, that a wider variety of colors than dull black can be employed. Many attempts have been made to make the rubber seals more attractive by providing surface coatings of a plastic material or the like thereon, which can be both colored or textured to match the appearance of the vehicle on which the seals are used.

Another problem associated with extruded rubber seals relates to the need for using different profiles to seal different portions of a movable window pane. More specifically, much effort has been expanded in providing connecting pieces for connecting the seal located at the belt line of the vehicle to the glass channel seals, and connecting the glass run channel seals to the header seal. While much progress has been made, automobile manufacturers continue to demand better and better appearance, and more and more flexibility in providing the colors and textures needed to match the appearance of the body of the vehicle. Some of the difficulties arise from the manufacturing tolerances associated with the vehicle body itself. Providing smooth transitions between the various sealing elements requires that the weld flange surrounding the window opening be particularly uniform and closely controlled. This adds cost to the assembly of the vehicle door, for example, and is undesirable for that reason.

Decorative trim pieces have been used in association with glass run channels to improve the appearance of the exterior edge of the glass run channel. Some trim pieces are attached to or co-extruded on to an exterior portion of the seal, while others are fastened to the structure of the door or body surrounding the window. Heretofore, multiple trim pieces have been required to cover the glass run, belt line and header portions of the window seal. The application of multiple decorative trim pieces to the exterior of a vehicle window opening is expensive, labor intensive, results in gaps and/or the need for corner pieces to connect abutting pieces and accommodate the shape of the window opening. These generally produce less than optimum appearance and a more difficult and undesirable manufacturing and installation process.

For example, separate trim pieces are attached along the belt line of the window opening, the B pillar, the top of the window, and the A pillar areas of the window opening. Often a still further piece of molding is attached near the A pillars/belt line junction, where an exterior rear view mirror is often positioned.

Even when decorative molding is incorporated in the glass run channel by insert molding or other techniques, multiple pieces are still required for the A and B pillars, the header and the belt line areas, as well as the mirror area.

Because of manufacturing tolerance problems, the quality of the fit and finish of the trim pieces is hard to control. The length of the weld flange around the entire window aperture is subject to manufacturing variances. In order for the multiple trim pieces to fit together in the most attractive way, the tolerances must be as small as possible. There is an increased cost associated with controlling the edge tolerances during stamping and forming, as well as connection with the tooling fixtures required during assembly of the door inner and outer panels to ensure that the weld flange is uniform. Reducing the number of length of areas that have critical dimensional characteristics reduces the cost of the door and is desirable.

There is a need for a sealing system for the movable windows of a motor vehicle that overcomes the disadvantages just mentioned. More specifically, there is a need for a sealing system that allows EPDM rubber or similar materials to be used to provide a high quality seal, but which at the same time provides flexibility as to coloring and texture, so that the needs of vehicle designers can be accommodated.

There is a need for a sealing system for motor vehicles that reduces the dimensional requirements on the vehicle door manufacturer, so as to avoid unnecessarily increasing the cost of assembly of the door. There is a need for a sealing system that can be applied to a door in which the tolerances between the assembled elements of the door are relatively loose, but which at the same time provides a continuous smooth appearance without step downs or the like.

SUMMARY OF THE INVENTION

It is an object of this invention to provide a one-piece glass opening cap or trim piece that is attached to the outer belt line seal, the A and B pillar glass run channels, and the header seal, without the need for corner or other connecting pieces. Optionally, the one piece opening cap may cover the portion of the window opening near the A pillar/belt line junction where an exterior rear view mirror is located.

It is another object of this invention to provide a one piece cap molding that accommodates manufacturing tolerances to a greater extent than heretofore possible, and allows for adjustment during installation to accommodate window openings that are slightly smaller or larger than nominal.

It is a further object of this invention to provide a glass opening cap molding that has an attachment structure that cooperates with a mating attachment structure on each of the belt line, pillar glass runs, and header molding pieces for allowing the cap molding to be snapped into place after the belt line seal, A and B channel glass run seals and header seals have been installed on the flange surrounding the window opening.

It is an object of this invention to provide a sealing and trim system for the window of a motor vehicle that utilizes a plurality of rubber seals, together with a one piece decorative surround cap that is attached to the seals, and provides a uniform continuous appearance that may be easily colored or textured to complement the vehicle body.

It is another object of this invention to provide seal elements that are compatible with a one piece decorative surround cap, for allowing the surround cap to be easily attached to the seals, after the seals have been installed in the vehicle.

Briefly stated, in accordance with a presently preferred embodiment of the invention, a decorative window surround sealing system includes a plurality of seals adapted to be mounted on a vehicle body for sealing a movable window panel in a window opening, each of the seals having an exterior surface, at least one fitting on at least one of the plurality of seals, a one piece surround cap having at least one cooperative fitting compatible with at least one fitting on the at least one of the plurality of seals for attaching the surround cap to the at least one fitting, the decorative surround cap covering a substantial portion of the exterior surface of each of the plurality of seals.

BRIEF DESCRIPTION OF THE DRAWINGS

The novel aspects of the invention are set forth with particularity in the appended claims. The invention itself, together with further objects and advantages thereof, may be more readily comprehended by reference to the following detailed description of a presently preferred embodiment of the invention, taken in conjunction with the accompanying drawing, in which:

DETAILED DESCRIPTION OF A PREFERRED EMBODIMENT OF THE INVENTION

Figure 1:
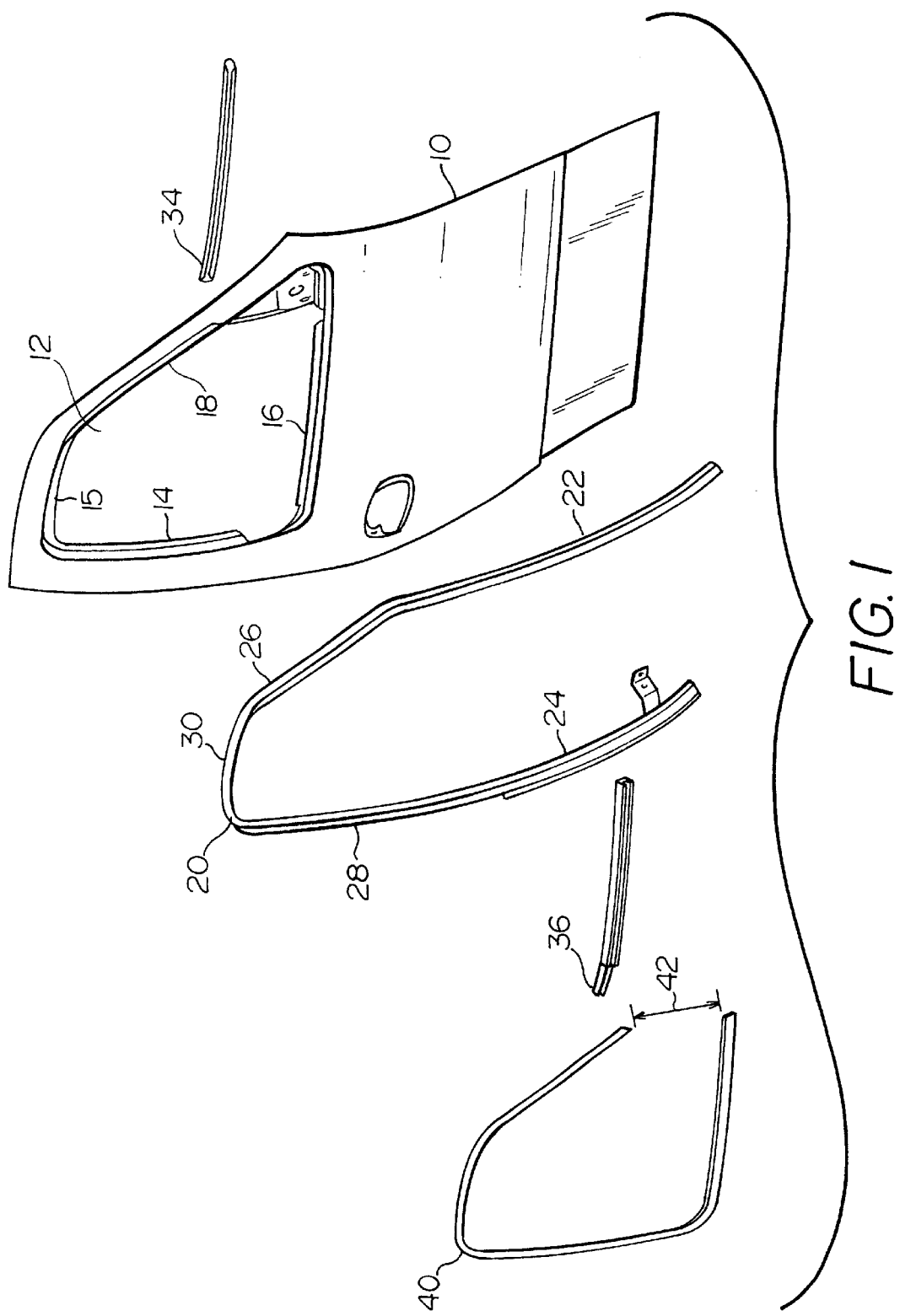
FIG. 1 is an exploded view of a decorative window surround sealing system having a one piece decorative surround cap in accordance with this invention.

FIG. 1 is an exploded view of a vehicle door showing a decorative window surround sealing system in accordance with the invention. The vehicle door panel 10 is a conventional stamped metal assembly, usually formed from steel, but which may also be formed from other metals, composites or the like, that includes an inner door panel and an outer door panel welded or otherwise attached together. A window opening 12 is formed in the door panel. A plurality of mounting flanges 14, 15, 16, 18 abut the edges of the window opening, for receiving a plurality of seals. The seals are adapted to engage a translationally movable window panel that can be moved from a position stored in the lower half of the door assembly, when the window is open, to a position filling and substantially closing the window opening when the window is closed. The window panel is raised and lowered by a regulator assembly of conventional construction, not shown in FIG. 1.

A glass run channel 20 supports the glass window panel as it moves from its open position to its closed position. The glass run channel includes a front leg 22 and a rear leg 24, extending into the space constituting the lower portion of the door assembly. An upper portion 26 of the glass run channel 20 is mounted to the flanges adjacent the edges of the window opening. The rearward most portion 28 of the glass run channel 20 mounts to a flange 14 adjacent the rearward most edge of the window opening proximate to the B pillar. The front edge 26 of the glass run channel 20 is attached to the flange 18 proximate the A pillar, and a header weatherseal 30 of the glass run channel 20 connects the front and rear portions.

While the invention is described in connection with an embodiment that mounts on the A and B pillars, the invention may be applied to window surrounds generally, such as in windows mounted between the B and C pillars or any pillars where windows are mounted.

The glass run channel of the window surround sealing system of this invention is largely conventional, except insofar as it includes structure for receiving a decorative surround, as will be described later.

An inner belt line weather seal 34 is attached to a flange on the inner door panel (not shown), and an outer belt line weather seal 36 is attached to a flange 16 the outer door panel. Again, as was the case with the glass run channel, the inner and outer belt line weather seals 34, 36 are of largely conventional construction, except that outer belt line weather seal 36 includes a structure for receiving the decorative surround cap.

The decorative surround cap 40 is a preferably molded plastic part that substantially covers the exposed portions of the glass run channel 20 and the outer belt line weather seal 36. Preferably, the decorative surround cap 40 covers substantially the entire exposed portions of the glass run 20 and outer belt line weather seal 36 surrounding the window opening 12. The decorative surround cap 40 may be formed in a continuous one-piece form having a continuous periphery, or, as shown in FIG. 1, a continuous form with a gap 42, preferably arranged to coincide with the A pillar of the vehicle door. The decorative surround cap 40 is preferably formed from a thermoplastic elastomer by injection molding or similar techniques, which are per se well known.

Figure 2:
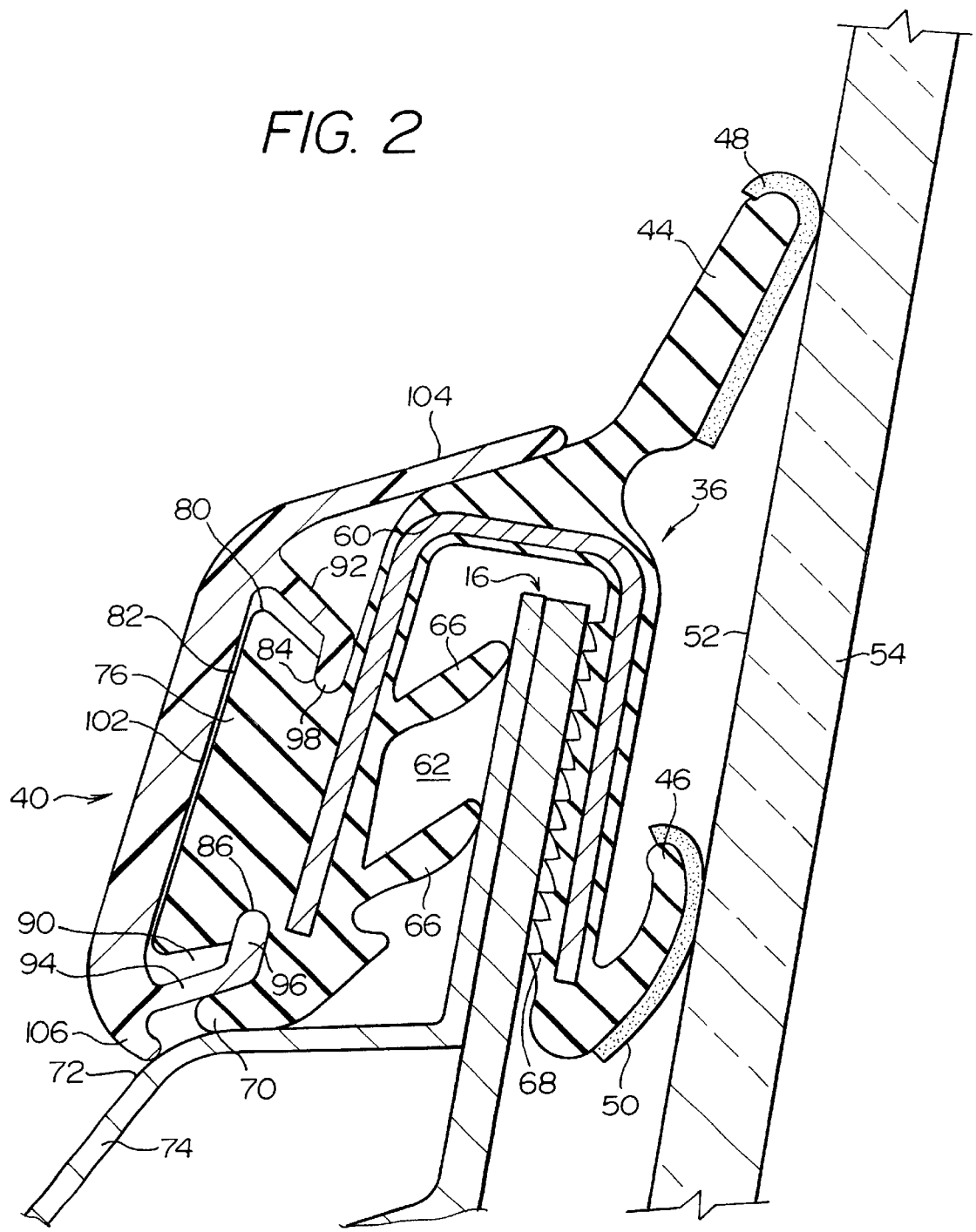
FIG. 2 is a section view of an outer belt line weatherseal, together with a decorative surround cap in accordance with the invention.

Referring now to FIG. 2, the first of several embodiments of the invention showing the cooperation between various portions of the decorative surround cap 40 and the sealing elements of the decorative window surround sealing system is shown. FIG. 2 shows a section view of the outer belt line weatherseal 36 in accordance with one aspect of the invention, having the decorative surround cap 40 attached thereto. Although the invention will be described in connection with a vehicle window surround sealing system applied to a window in a vehicle door, the system can also be utilized in connection with other moving panels in vehicles such as sun roofs and side windows not mounted in doors.

A preferably extruded belt line weatherseal 36 is mounted on a generally vertically extending welded flange 16 formed at the periphery of inner and outer door panels. While the inner and outer door panels are generally made from metal, such as steel, they can be formed from other materials, such as composites, reinforced fiberglass, or sheet molded compounds. The invention does not rely on any particular material being used in the formation of a vehicle body.

The belt line weatherseal 36 is preferably formed from EPDM or other rubber of a type per se well known to those skilled in the art. The details of the belt line weatherseal shown in FIG. 2 are in many respects not relevant to the present invention, except as will be described in more detail below. For example, the weatherseal 36 shown in FIG. 2 includes two articulated sealing lips 44, 46 having surface portions 48, 50 formed thereon of low friction material, such as flocking or the like for engaging the surface 52 of a translational window panel 54 as it slides by the seal.

Further, the seal may preferably be provided with a U-shaped serpentine wire or stamped metal reinforcing element 60 embedded in the rubber belt line weather seal 36 for strengthening the seal and holding it securely to the flange.

The U-shaped reinforced channel 62 defines an inner chamber in which major 66 and minor 68 gripping fins are disposed for retaining the weatherseal 36 on the flange 16. Major gripping fins 66 are deflected as the seal is placed on the fringe and urge the seal into contact with a multiplicity of minor gripping fins 68, so that the friction created by the major or minor gripping fins is adequate to retain the seal on the flange as the window panel 54 moves from its closed to its open position and vice versa.

The rubber weatherseal 36 preferably has a tail or gimp seal portion 70 that abuts the outside surface 72 of the outer vehicle door panel 74 to form a weather tight seal for preventing water or other elements from bypassing the seal and entering the interior of the vehicle.

The portion of the one piece decorative surround cap 40 that covers the belt line weather seal of the vehicle window surround system of the invention is attached to an enlarged t-shaped attachment lug 76 of the weatherseal. The attachment lug includes an enlarged outwardly flared head 80 having a flat surface 82 facing away from the door flange. The head includes a pair of undercut grooves 84, 86 extending along the base of the head at the top and bottom thereof.

The one piece decorative surround cap 40 has a slot 90 for receiving the enlarged head 80 of the lug 76 of the weatherseal 36. The slot 90 is defined by a pair of elongated legs 92, 94 having inwardly extending feet 96, 98 for engaging the undercut slots 84, 86 of the weatherseal. The legs 92, 94 define a chamber or slot 90 having a t-shape similar to the shape of the attaching lug 76. The head 80 of the attaching lug 76 supports the inside surface of the one piece decorative surround cap 40. Optionally, an adhesive layer 102 or other attached means may be interposed between the lug 76 and the inside surface of the surround cap 40, although this is not essential. The surround cap 40 includes an upper cover flange 104 extending from the cap towards the window panel 54 and overlying a substantial portion of the upper surface of the weatherseal 36 up to but not including the upper sealing lip 44. The surround cap 40 also includes a lower downwardly extending flange 106 of considerably smaller dimensions that extends towards and forms a seal with the outer surface 72 of the outer door panel 74, thereby completely obscuring the lower portion of the weatherseal.

The decorative surround cap 40 of this invention is preferably formed from a plastic material such as a thermoplastic elastomer. The surround cap 40 is preferably colored to match or contrast with the body color of the vehicle, and may be provided with a textured finish or the like, as desired by the vehicle manufacturer. The one piece plastic surround cap 40 is considerably more versatile as far as colorization and texturization than is the extruded rubber seal. Preferably, the one piece surround cap 40 is molded by injection molding or the like, which adds to the flexibility in providing a desired color and surface finish.

As can be readily seen from FIG. 2, the one piece decorative surround cap 40 substantially covers the outer surface portion of the extruded rubber belt line weather seal 36, except for the upper sealing lip 44.

Figure 3:
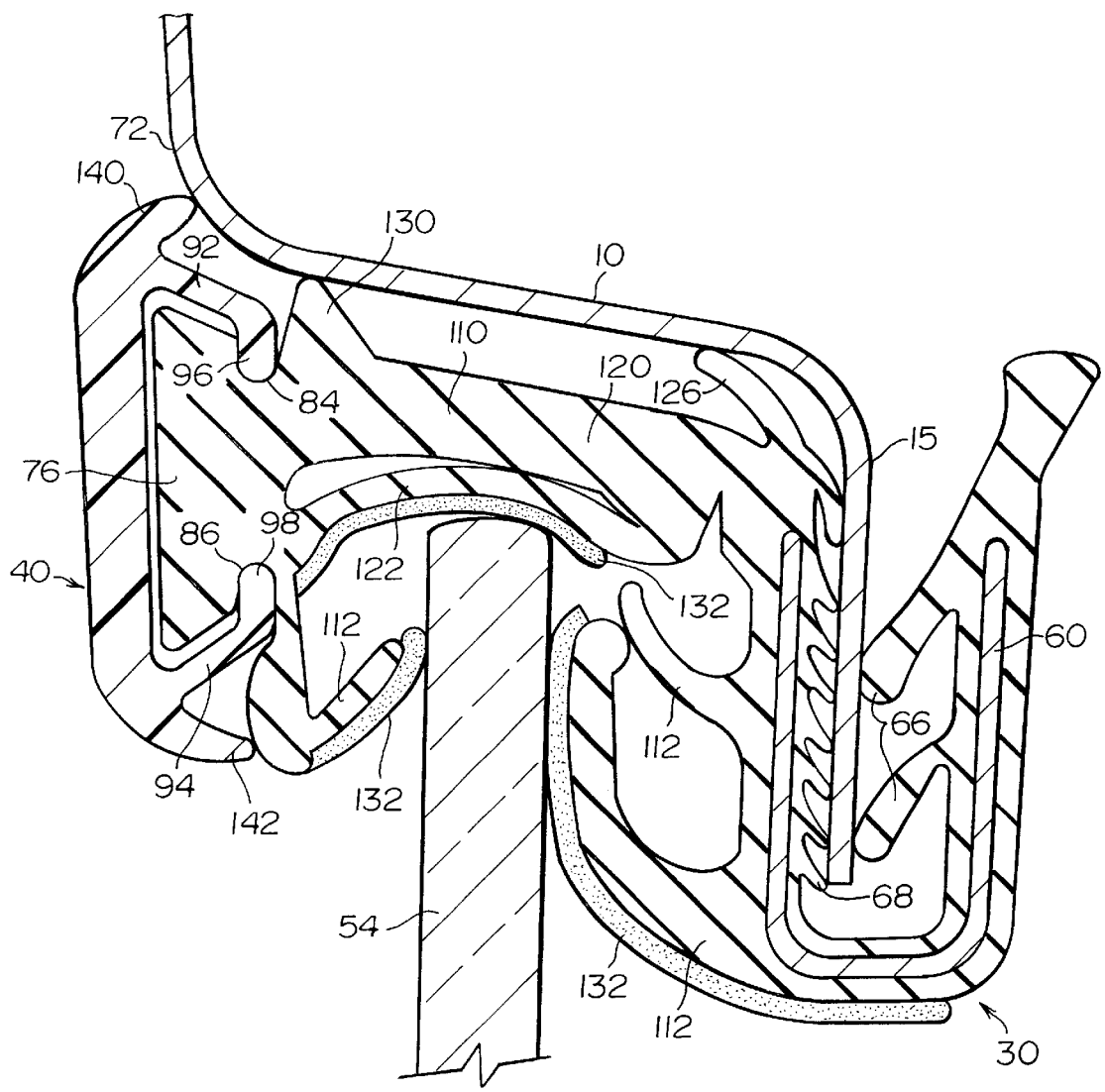
FIG. 3 is a section view of a header portion of a glass run seal having a decorative surround cap in accordance with the invention.

A header seal in accordance with one embodiment of the invention is shown in a cross section in FIG. 3. Although the various structures for attaching the one piece decorative surrounding cap to the rubber sealing elements may be "mixed and matched", the arrangement shown in FIG. 3 is particularly compatible with the arrangement shown in FIG. 2, to the extent that it uses a similar attachment method. The header weatherseal 36 is adapted to be mounted on a flange 15 which although shown as including only a portion of the vehicle door panel 10, may actually include a portion of an inner door panel as well, although this would not change the construction of the header weatherseal 30 or the one piece decorative surrounding cap 40 in any way. Header seal 30 is preferably made from rubber extruded. Header weatherseal 30 encapsulates a U-shaped stiffening metal element 60 that may be a wire or a stamped metal carrier or other similar material. A plurality of major 66 and minor 68 fins disposed within the U-shaped channel of the header weatherseal 30 of the sealing assembly engage the flange 15 to securely hold the weatherseal assembly on the flange.

The header weatherseal 36 includes an oppositely facing somewhat larger U-shaped member 10 that includes a plurality of sealing lips 112 extending from the ends of inner and outer legs of the U-shaped member 110 towards a translational window panel 54. The base of the larger U-shaped section 110 of the weatherseal has a hollow configuration consisting of a relatively thick body portion 120 and a somewhat thinner sealing membrane 122. The body portion 120 is provided with a sealing fin 126 at one corner for engaging the outer surface of the vehicle door panel 5 of the vehicle body, and a generally triangular shaped seal 130 also engaging an outer surface of the vehicle door 10 at the opposite end of the base 110. The inwardly extending sealing lips 112 and the collapsible membrane portion 122 are preferably provided with friction resistant coatings 132, such as a layer of flock or the like, to enable the translational window panel 54 to slidably engage the surfaces with a minimum of resistance.

The rubber header weatherseal 36 as an outwardly tapered sealing lug 76 attached to the outer leg of the major U-shaped portion 110 thereof, that is substantially similar to the lug 76 shown attached to the outer belt line weatherseal 36 in FIG. 2. The attaching lug 76 has first and second undercut grooves 84, 86 at the top and bottom thereof, these directions along with other directions are used in the description of this invention being relative to the ordinary in use orientation of a vehicle, that is wheels down.

Each of upper and lower legs 92, 94 has an inwardly extending foot 96, 98 for engaging the undercut grooves 84, 86 in the rubber seal for holding the one piece decorative surround cap 40 in place. The surround cap 40 has a first sealing flange 140 at an upper end thereof, contacting an outer surface 72 of the body panel for preventing moisture or dirt from entering the space between the decorative surround cap and the body panel. The decorative surround cap 40 has another flange 142 at the lower edge thereof, for substantially covering and engaging a surface of the molded rubber header weatherseal 30, so as to substantially conceal the entire header weatherseal 30, except for the sealing lip 112 that engages the outer surface of the window panel 54.

Figure 4:
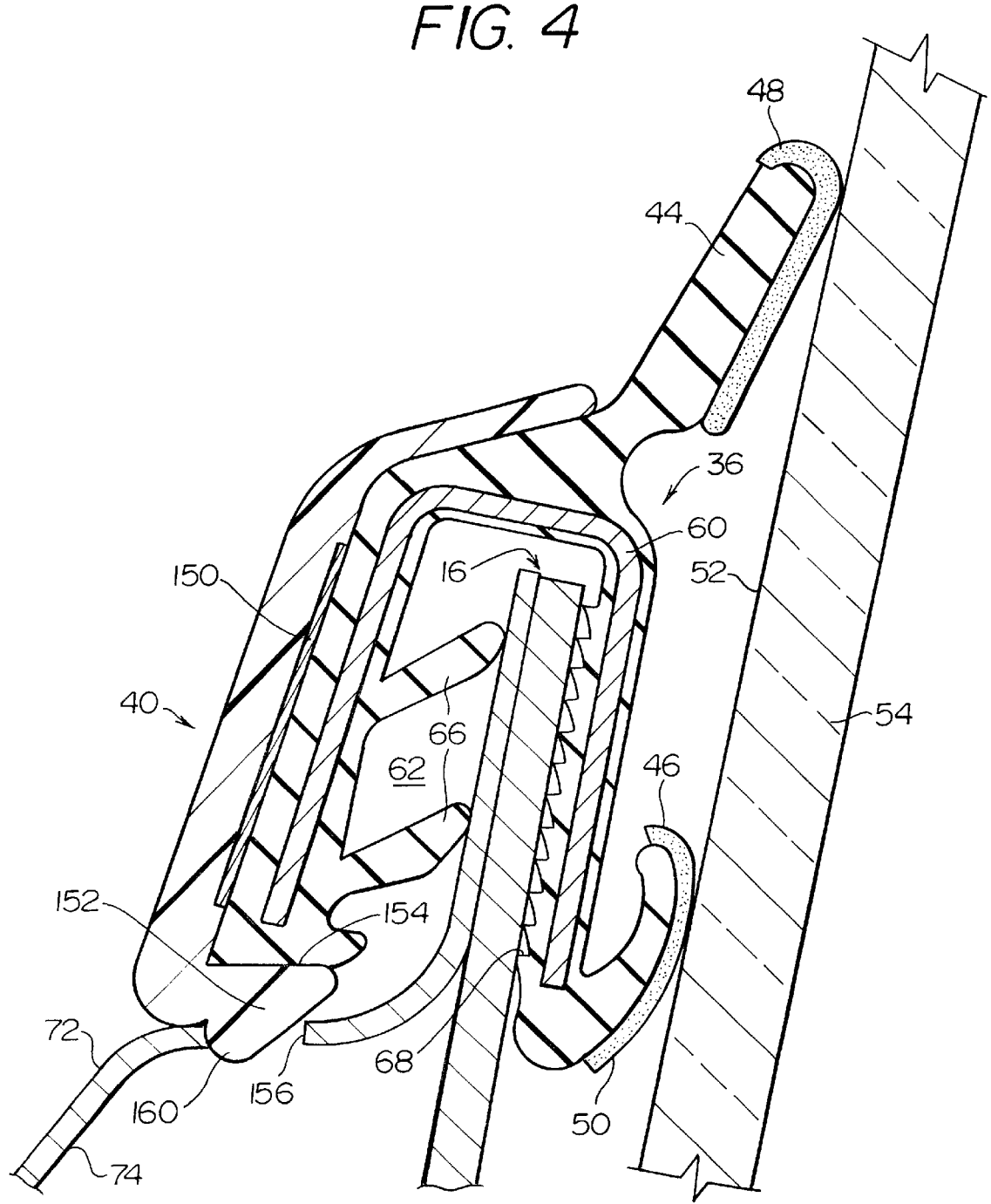
FIG. 4 is a section view of an outer belt line weatherseal having a decorative surround cap in accordance with another aspect of the invention.

Turning now to FIG. 4, the outer belt line portion of a decorative vehicle window surround system in accordance with another embodiment of the invention is shown in cross-section. In this figure, and in the other figures, like or substantially similar elements are denoted by the same reference number. Except where necessary to point out differences, the description of elements shared among the different embodiments of the invention will not be repeated unnecessarily.

The outer belt line weatherseal 36 of FIG. 4 is mounted on the upwardly extending flange 16 formed by the edges of the inner and outer door panels. Major 66 and minor 68 fins within a U-shaped channel 62 in the weatherseal 36, which is reinforced by a metal element 60, engage the flange 16 to hold the weatherseal 36 in place. The decorative surround cap 40 is attached to the outside surface of the weatherseal 36. A layer of adhesive or double sided tape 150 may be interposed between the outer surface of the rubber weatherseal 36 and the inner surface of the thermoplastic decorative surround cap 40. In addition, the surround cap has an inwardly extending barbed lug 152 that engages the distal end 154 of the outer leg of the U-shaped weatherseal 36 at an inner surface thereof, and engages an opening or depression, preferably a small hole or indentation 156, in the outer door panel 74, at the lower end or barb 160 of the barbed lug 152. The barb 160 of the barbed lug is held in engagement with an inner surface of the opening 156 by downward pressure exerted on the lug by the rubber weatherseal assembly 36. Preferably, the decorative surround cap 40 is attached to the outer surface of the rubber weatherseal 36 after the weatherseal is disposed on the flange 16. Preferably, a layer of adhesive 150 is applied to the inside surfaces of the decorative surround cap 40, and/or to the outside surface of the rubber weatherseal 36, and the barbed lug 152 of the decorative surround cap 40 is snapped into position engaging the opening 156 the outer door panel 74 at the same time the decorative surround cap 40 is pressed into firm engagement with the outer surface of the weatherseal 36, to cause the adhesive layer 150 to bond the two together.

Figure 5:
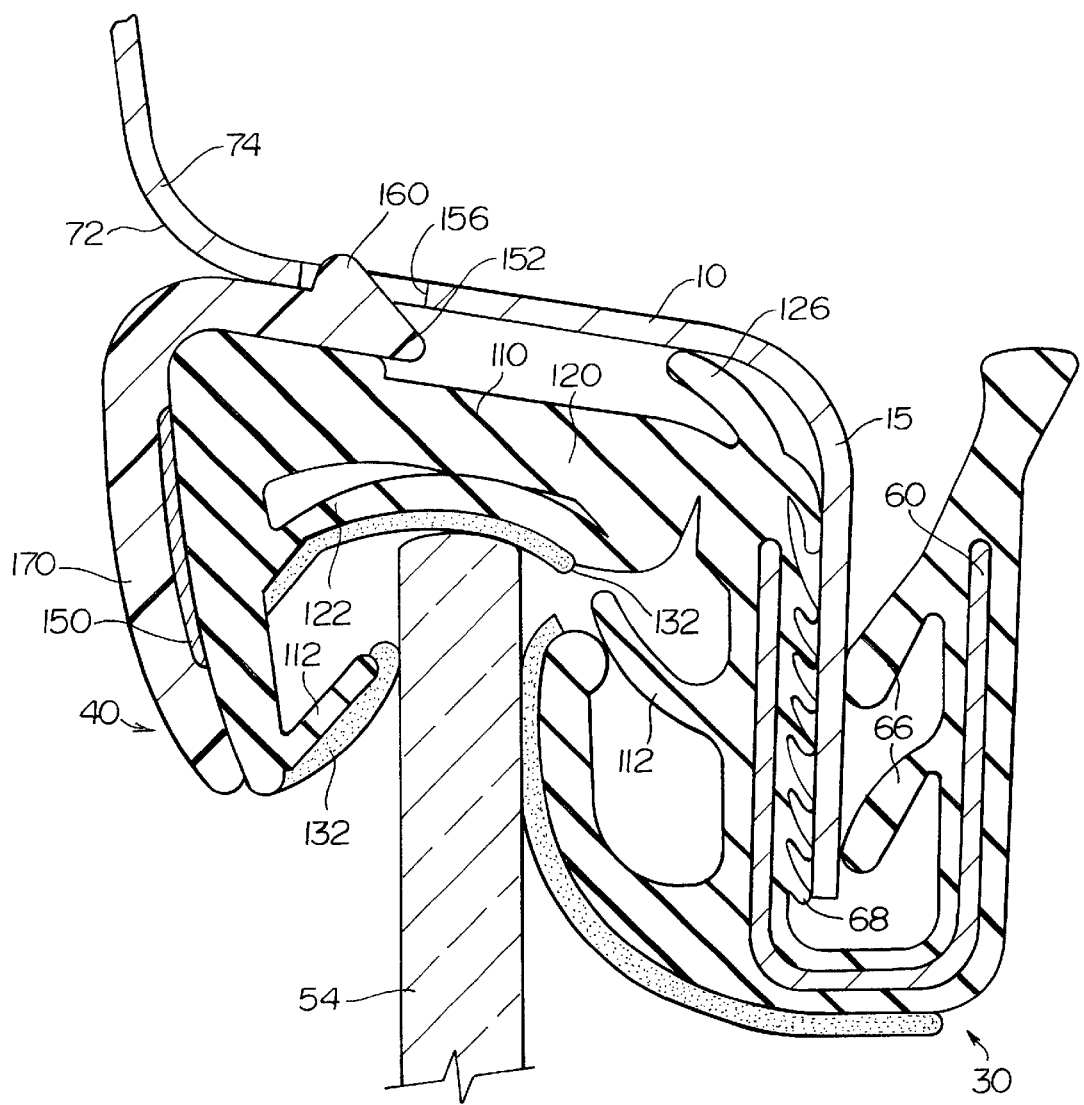
FIG. 5 is a section view of a header portion of a glass run seal in accordance with another embodiment of the invention.

FIG. 5 shows a header seal portion of a window surround sealing system in accordance with the embodiment of the invention exemplified by the belt line seal of FIG. 4. Much of the header assembly of FIG. 5 is similar to the header assembly shown in FIG. 3, and to that extent, like reference numbers will be used and the description thereof will not be unnecessarily repeated. The one piece decorative surround cap 40 according to this invention is held in place with respect to the header weatherseal 30 and the body of the vehicle, in a manner substantially similar to that shown in FIG. 4. That is, the decorative surround cap 40 includes a body portion 170 attached to an outer surface of the weatherseal 36 with a layer of adhesive 150 or the like. An upper barbed lug 152 of the decorative surround cap 40 extends between the base 120 of the window receiving U-shaped channel portion 110 of the header weatherseal 30, and the body of the vehicle. A barbed end 160 of a leg extends into an opening or depression 156 in the vehicle body for retaining the decorative surround cap 40 in position. Similar to the manner in which the decorative surround cap 40 was put into place to cover the belt line weatherseal 36, the decorative surround cap 40 is preferably attached to the outer surface of the rubber header weatherseal 30 by applying a layer of adhesive 150 to the inner surface of the decorative surround cap 40, and/or to the outer surface of the header weatherseal 30, and then inserting the barbed lug 152 into the space between the weatherseal 30 and the outer surface 72 of the door panel 74 until the barbed portion 160 of the lug 152 engages the opening or depression 156 in the panel, thereby locking the decorative surround cap 40 in place.

Figure 6:
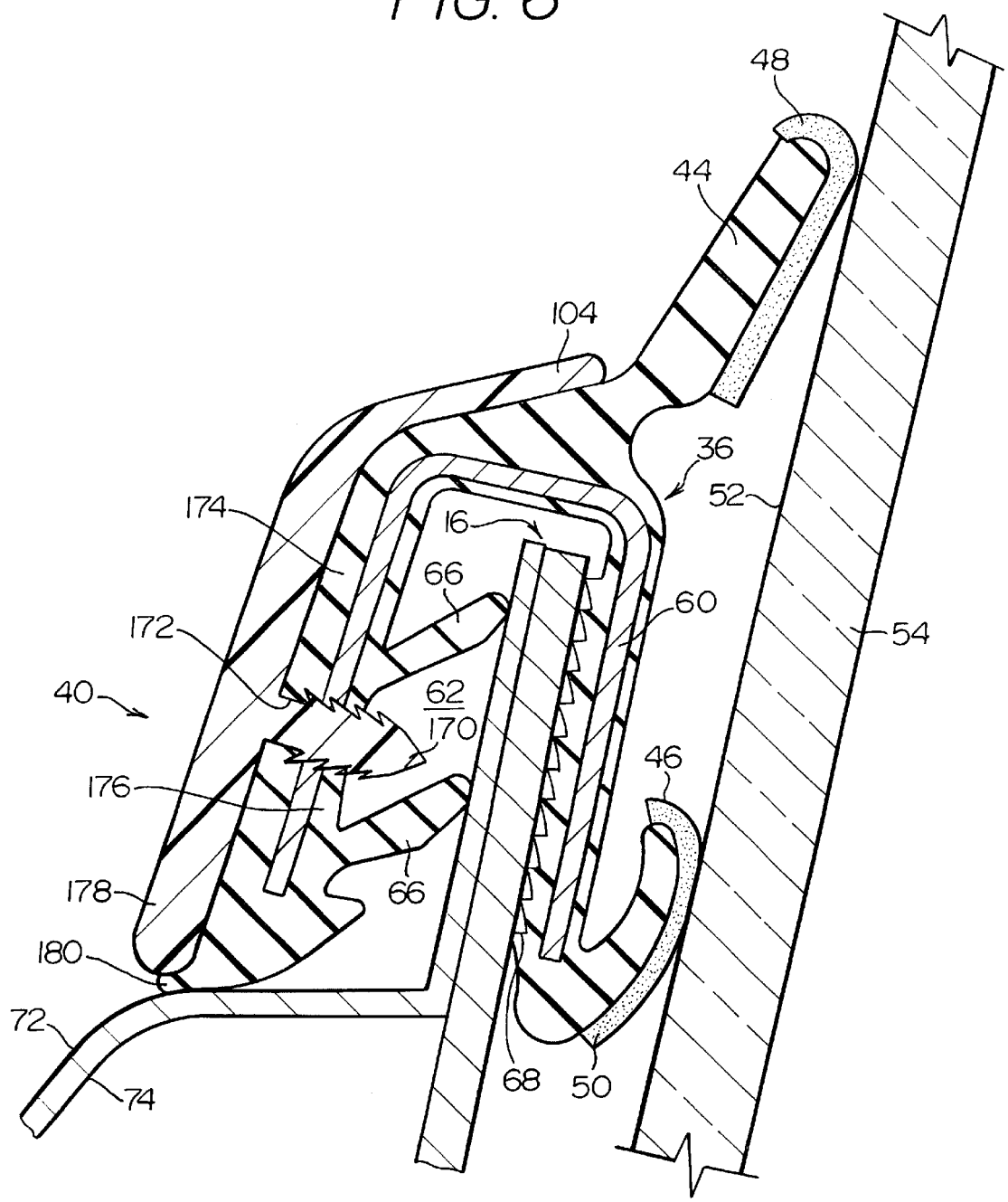
FIG. 6 is a section view of an outer belt line weatherseal in accordance with still another embodiment of the invention.

FIG. 6 is a section view of another embodiment of an outer belt line portion of a decorative window vehicle surround sealing system in accordance with this invention. As shown in FIG. 6, the decorative surround cap 40 includes an inwardly extending barbed projecting post 170 that engages an opening 172 preferably cylindrical, in one leg of the U-shaped mounting channel portion of the belt line weatherseal 36 and passes through the inner and outer rubber surface portions 174, 176 and the metal carrier embedded therein.

Preferably, the lower end 178 of the decorative surround cap 40 extends almost into contact with the outer surface 72 of the outer door panel 74. A very small sealing projection 180 is attached to the end of the outer leg of the U-shaped mounting channel, to form a weather tight seal between the weatherseal and the outer surface 72 of the outer door panel 74, to prevent water or debris from entering the space between the belt line weatherseal element and the flange.

Figure 7:
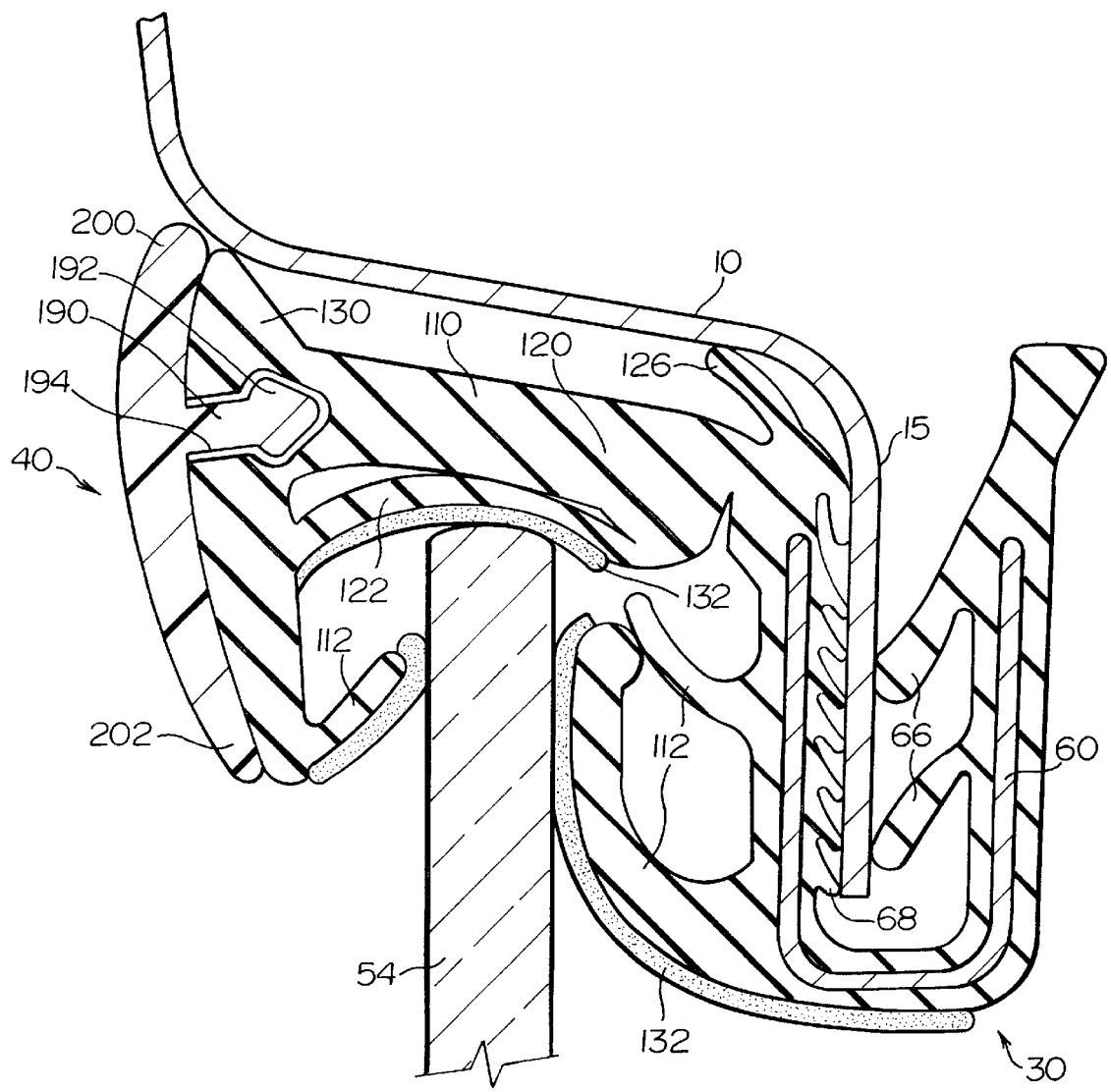
FIG. 7 is a section view of a header portion of a glass run seal in accordance with another embodiment of the invention.
Figure 8:
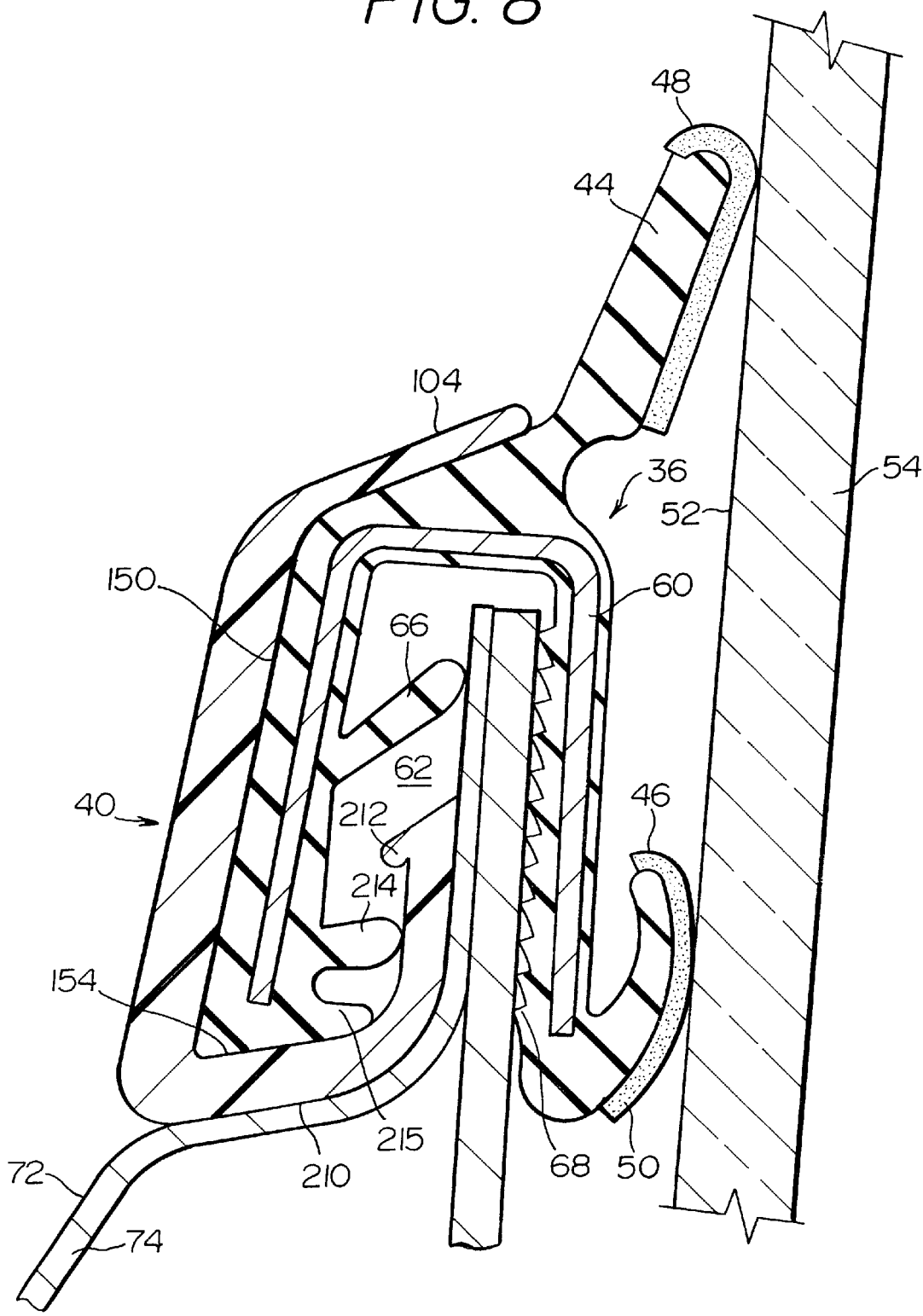
FIG. 8 is a section view of an outer belt line weatherseal having a decorative surround cap in accordance with still another embodiment of the invention.

Referring now to FIG. 7, another embodiment of a header weatherseal 30 portion of the window surround sealing system of the invention is shown. FIGS. 7 and 8 should be considered together, as illustrating alternative methods for attaching the decorative surround cap to the outer surface of the weatherseal that could be used either consistently or interchangeably. As shown in FIG. 7, the decorative surround cap 40 includes a fastener for attaching the surround cap to the seal. The fastener used in the present invention is an inwardly projecting mounting stud 190 having an enlarged head 192 thereon. The mounting stud is received in an opening 194 in the body portion of the rubber header weatherseal assembly 30. Preferably, the mounting stud 190 and the opening 194 are sized so that the decorative surround cap 40 snaps into place when pressed into engagement with the rubber header weatherseal element 30. The decorative surround cap 40 has an upper flange that extends into contact with the outer surface of the automobile outer body panel 15 at the upper end of the cap. The lower end 202 of the cap 40 extends downwardly until it substantially covers the entire outer surface of the rubber header weatherseal 30, except for the sealing leg 112.

Figure 9:
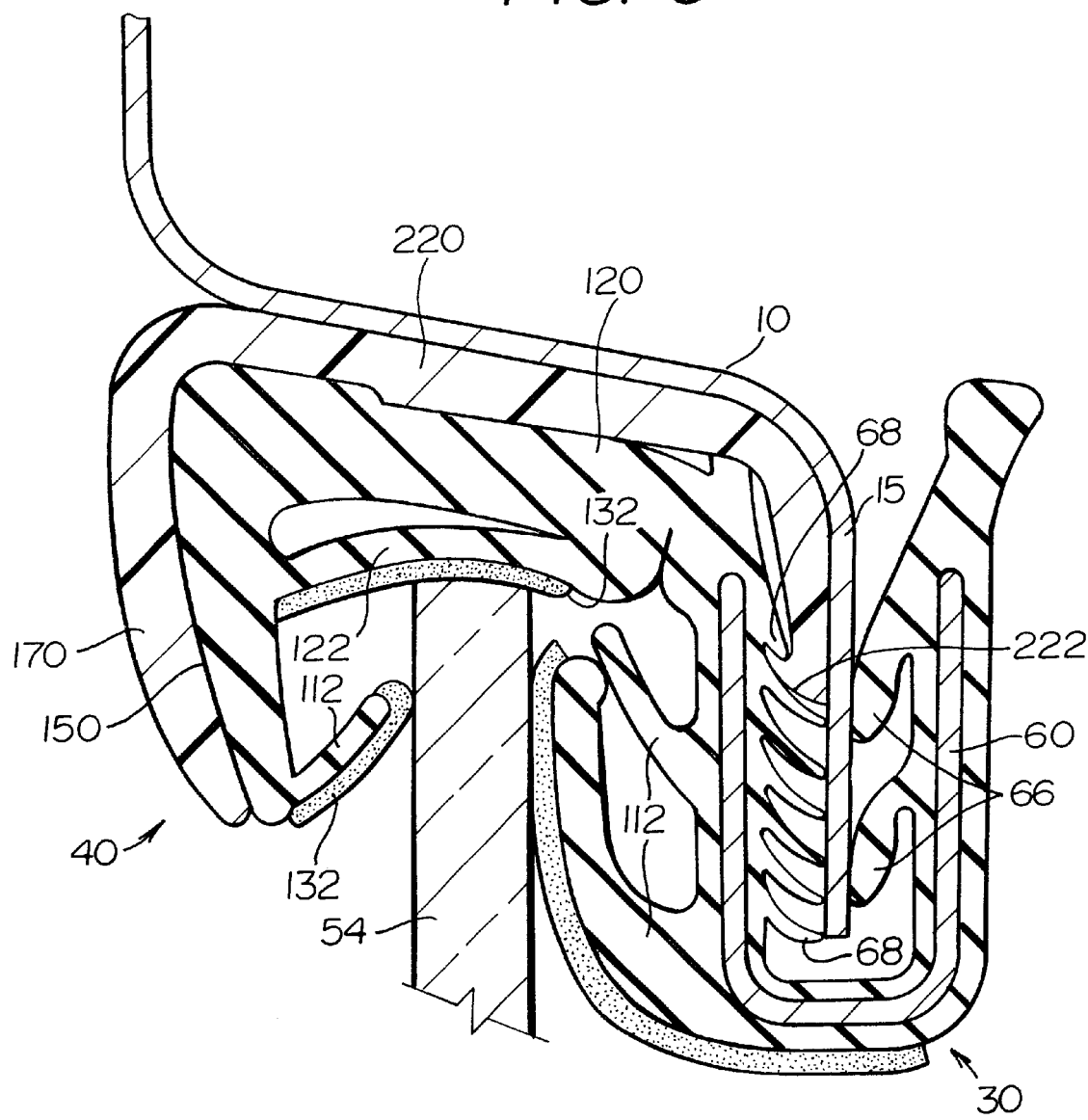
FIG. 9 is a section view of a header portion of a glass run seal having a decorative surround cap in accordance with a still further embodiment of the invention.

Another embodiment of the invention is shown in FIGS. 8 and 9. The decorative surround cap 40 is attached to the outer surface of the extruded weatherseal 36 by a layer of adhesive 150, double sided tape or the like. An inwardly projecting lower leg 210 of the decorative surround cap 40 extends underneath the distal end 154 of the outer leg of the U-shaped channel portion of the weatherseal 36, following the contour of the outer door panel 74 and upwardly there along to a position between the outer leg of the U-shaped gripping channel and the outer surface of the flange. Preferably, an end barb 212 is provided on the leg to hold it in place.

In addition to a major sealing fin 66, the outer leg of the U-shaped gripping portion of the rubber weatherseal assembly has a pair of secondary legs 214, 215 that engage the outer surface of the lower leg of the decorative surround cap 40 to anchor it in place.

Referring now to FIG. 9, a corresponding structure for the header seal portion of the window surround sealing system is shown in a section view. The outer portion 170 of the decorative surround cap 40 is attached to the outer surface of the header weatherseal 30 with an adhesive 150, double sided tape or the like. The decorative surround cap 40 has an inwardly extending upper leg 220 that wraps around substantially the entire upper surface of the base 120 of the U-shaped window channel portion of the weatherseal, and terminates in a barbed head 222 that engages and interlocks with a first one of the minor fins 68 within the U-shaped gripping channel portion of the weatherseal. The remaining minor fins extend into contact with an outer surface of the flange, as do the major fins 66 of the gripping portion of the weatherseal, as has already been described. In other respects, the header seal of FIG. 9 is similar to the header seals of FIGS. 3 and 7.

While the plurality of seals described above have been illustrated as separate elements in accordance with one aspect of the invention, sometimes one or more of the seals may be connected, for example by molded comer pieces, so that a single piece seal having a plurality of sealing profiles is created. As used in this invention, a plurality of seals means not only a plurality of discrete seals, but a one piece seal assembly that includes a plurality of sealing profiles.

While the invention has been described in connection with several presently preferred embodiments thereof, those skilled in the art will recognize that many modifications and changes may be made therein without departing from the true spirit and scope of the invention, which accordingly is intended to be defined solely by the appended claims.

What is claimed is:

1. A decorative vehicle window surround sealing system comprising:
    a plurality of window seals attached directly to a vehicle body for sealing a window panel and each said seal having an exterior surface;
    a one piece decorative surround cap substantially covering the exterior surface of each of the seals; and
    a fitting on the surround cap and a cooperative fitting on at least one of the plurality of seals for attaching to the surround cap wherein the cooperative fitting consists of a t-shaped lug attached to the fitting on the surround cap.

2. The window surround sealing system of claim 1 in which the one piece decorative surround cap comprises a molded thermoplastic cap.

3. The window surround sealing system of claim 1 in which the decorative surround cap comprises an undercut slot engaging the t-shaped lug.

4. The window surround sealing system of claim 3 in which the one piece decorative surround cap comprises a projecting lip extending into contact with a portion of a surface of the vehicle body.

5. The window surround sealing system of claim 3 in which the one piece decorative surround cap comprises a projecting lip extending into contact with a portion of a surface of the at least one of the plurality of seals.

6. The window surround sealing system of claim 3 in which the one piece decorative surround cap comprises a closed annular profile.

7. A vehicle window surround sealing system comprising:
    a plurality of discrete seal members which together completely surround a window opening in a vehicle body to provide a window seal, each said seal member presenting a sealing profile and each said seal member having a mounting element for separately mounting the corresponding seal member directly to the vehicle body for sealing about a window panel, and the window seal having an exterior surface;
    a fitting on at least one of the seal members;
    a one piece decorative surround cap for covering a substantial portion of the exterior surface of the window seal; and
    a cooperating fitting on the surround cap for attaching the surround cap directly to the fitting on the at least one of the seal members, whereby the at least one seal member provides means for attaching the one piece surround cap relative to the vehicle body.

8. The window surround sealing system of claim 7 in which the one piece surround cap comprises a molded thermoplastic cap.

9. The window surround sealing system of claim 7 in which the one piece surround cap comprises a projecting lip extending into contact with a portion of a surface of the vehicle body.

10. The window surround sealing system of claim 7 in which the one piece surround cap comprises a projecting lip extending into contact with a portion of a surface of the at least one of the members of seal.

11. The window surround sealing system of claim 7 in which the one piece surround cap comprises a closed annular profile.

12. The window surround sealing system of claim 7 in which the cooperating fitting and the fitting on the at least one of the seal members comprise respectively a fastener extending from the one piece surround cap and a corresponding opening in the at least one the of seal members for receiving the fastener and attaching the surround cap to the at least one of the seal members.

13. The window surround sealing system of claim 12 in which the fastener comprises a barbed fastener.

14. The window surround sealing system of claim 12 in which the fastener comprises a projecting fastener having an enlarged head and the corresponding opening comprises an enlarged open portion engaging the enlarged head.

15. A vehicle window surround sealing system comprising:
    a plurality of seals adapted to be mounted on a vehicle body for sealing a window panel, each of the seals having an exterior surface;
    a one piece surround cap for covering a substantial portion of the exterior surface of each of the plurality of seals;

a t-shaped lug on the exterior surface of at least one of the seals; and a compatible fitting on the surround cap for attaching to the t-shaped lug and for attaching the surround cap to the at least one seal.

16. The window surround sealing system of claim 15 in which the surround cap comprises an undercut slot engaging the t-shaped lug.

* * * * *